United States Patent
Pantos et al.

(10) Patent No.: US 11,265,586 B2
(45) Date of Patent: Mar. 1, 2022

(54) SKIPPING SEGMENTS IN PLAYLISTS

(71) Applicant: Apple Inc., Cupertino, CA (US)

(72) Inventors: Roger N. Pantos, Scotts Valley, CA (US); Eryk Vershen, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/929,501

(22) Filed: May 6, 2020

(65) Prior Publication Data

US 2020/0359062 A1    Nov. 12, 2020

Related U.S. Application Data

(60) Provisional application No. 62/843,887, filed on May 6, 2019.

(51) Int. Cl.
*H04N 21/2387* (2011.01)
*H04N 21/262* (2011.01)
*H04N 21/845* (2011.01)

(52) U.S. Cl.
CPC ... *H04N 21/2387* (2013.01); *H04N 21/26258* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 8,280,863 B2* | 10/2012 | Pantos | ............ | H04N 21/26258 707/693 |
| 9,712,890 B2* | 7/2017 | Shivadas | ................ | H04N 19/98 |
| 2004/0047592 A1* | 3/2004 | Seo | ..................... | H04N 1/00198 386/247 |
| 2012/0311094 A1* | 12/2012 | Biderman | .......... | H04N 21/8456 709/219 |
| 2013/0159421 A1* | 6/2013 | Yue | ......................... | H04L 65/60 709/204 |
| 2014/0380352 A1* | 12/2014 | Mangalore | ......... | H04N 21/8456 725/31 |
| 2014/0380376 A1* | 12/2014 | Schmidt | .............. | H04L 65/4084 725/54 |
| 2015/0334431 A1* | 11/2015 | Bjordammen | ..... | H04N 21/6587 725/32 |
| 2015/0347415 A1* | 12/2015 | Pantos | ............... | H04N 21/2668 709/219 |
| 2015/0373383 A1* | 12/2015 | Pichumani | ....... | H04N 21/23439 725/90 |
| 2016/0323653 A1* | 11/2016 | Chen | .................. | H04N 21/6587 |

(Continued)

OTHER PUBLICATIONS

Roger Pantos, William May, "HTTP Live Streaming", MLB Advanced Media, Aug. 2017, 60 pages.

*Primary Examiner* — Alexander Q Huerta

(74) *Attorney, Agent, or Firm* — Womble Bond Dickinson (US) LLP

(57) ABSTRACT

In a streaming media method, a set of one or more server devices can provide media playlists that skip media segments. For example, a client device can receive a full media playlist from a server device, and the full media playlist can indicate that the server device supports providing updated playlists that are condensed by skipping media segments. The client device can then request an updated playlist that skips media segments and use that updated playlist to request and receive steaming content.

20 Claims, 4 Drawing Sheets

```
#EXTM3U
#EXT-X-TARGETDURATION : 6
#EXT-X-SERVER-CONTROL : CAN-BLOCK-RELOAD = YES,
         CAN-SKIP-UNTIL = 36.0
#EXT-X-MEDIA-SEQUENCE : 1000

#EXTINF : 6
Segment 1000.ts
#EXTINF : 6
Segment 1001.ts
    :
#EXTINF : 6
Segment 1414.ts
#EXTINF : 6
Segment 1415.ts    } SKIP BOUNDARY 309
    :
#EXTINF : 6
Segment 1419.ts
```

(56) References Cited

U.S. PATENT DOCUMENTS

2017/0013037 A1* 1/2017 Cang .................... H04L 65/4076
2018/0041787 A1* 2/2018 Panje ............... H04N 21/26258
2018/0048923 A1* 2/2018 Owen ................ H04N 21/2387
2020/0267437 A1* 8/2020 Pantos ............... H04N 21/4621

* cited by examiner

```
                                                          ← 301
#EXTM3U
#EXT-X-TARGETDURATION : 6
#EXT-X-SERVER-CONTROL : CAN-BLOCK-RELOAD = YES,
         CAN-SKIP-UNTIL = 36.0
                                              ← 305
#EXT-X-MEDIA-SEQUENCE : 1000    ← 307

#EXTINF : 6    ← 303      304
Segment 1000.ts
#EXTINF : 6
Segment 1001.ts
  ⋮          ← 302
#EXTINF : 6
Segment 1414.ts
#EXTINF : 6
Segment 1415.ts   ⎫ SKIP BOUNDARY 309
  ⋮
#EXTINF : 6
Segment 1419.ts
```

FIG. 3A

```
                                                          ← 321
#EXTM3U
#EXT-X-TARGETDURATION : 6
#EXT-X-SERVER-CONTROL : CAN-BLOCK-RELOAD = YES,
         CAN-SKIP-UNTIL = 36.0
                                              ← 305
#EXT-X-MEDIA-SEQUENCE : 1000    ← 307
                                  ← 304

#EXT-X-SKIP-SEQUENCE : SKIPPED-SEGMENTS = 414
                                         ← 323

#EXTINF : 6
Segment 1414.ts
#EXTINF : 6
Segment 1415.ts   ⎫ 309
  ⋮
#EXTINF : 6
Segment 1419.ts
```

FIG. 3B

SKIPPING SEGMENTS IN PLAYLISTS

This application claims the benefit of U.S. Provisional Patent Application No. 62/843,887 filed May 6, 2019, which is incorporated herein by reference.

BACKGROUND

This disclosure generally relates to streaming media such as content (e.g., movies, TV shows, live sports events, etc.) that is streamed through the use of media playlists such as playlists used in Apple's HTTP Live Streaming (HLS) protocol. In this protocol, media segments are listed in a media playlist that is received by a client device from a server device. The client device requests the media segments and presents them over time to recreate the content such as a live sports event (e.g., a baseball game).

SUMMARY OF THE DESCRIPTION

According to one aspect described herein, a server can opt-in to an approach that skips media segments up to a predetermined point in time before a live edge of a media program. The server can advertise that it supports this approach by including a skip indicator as a tag in a media playlist transmitted to a client device, and the skip indicator can include a value (in seconds) for a skip boundary which defines the time immediately before the live edge that cannot be skipped. In one aspect, the skip indicator can take the form of: #EXT-X-SERVER-CONTROL:CAN-SKIP-UNTIL=36.0, where 36.0 is the skip boundary in this example which is 36 seconds before the live edge of the program's content. A client device can receive the media playlist containing the skip indicator and can decide to request an updated and condensed playlist in which media segments (along with tags associated with those media segments) can be skipped (e.g., omitted) from the updated and condensed playlist. The updated and condensed playlist can include a skip tag that indicates the number of media segments that have been skipped in the updated and condensed playlist. The client device can request the updated and condensed playlist at least once every target duration (or more rapidly in the case of low latency HLS) by including a query parameter (e.g., "_HLS_skip=YES") in the playlist update URL. The skip boundary specifies an amount of time (e.g., in seconds) near a live edge of the program that cannot be skipped.

The aspects and embodiments described herein can include non-transitory machine readable media that store executable computer program instructions that can cause one or more data processing systems (such as client devices and one or more server systems) to perform the one or more methods described herein when the computer program instructions are executed by the one or more data processing systems. The instructions can be stored in nonvolatile memory such as flash memory or dynamic random access memory or other forms of memory.

Other aspects are also disclosed herein.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIG. 3A is an example of a current updated full playlist that can be used by a server device to create an updated and condensed playlist.

FIG. 3B is an example of an updated and condensed playlist created from the full playlist shown in FIG. 3A.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments and aspects.

Reference in the specification to "one aspect", "one embodiment" or "an embodiment" or "an aspect" means that a particular feature, structure, or characteristic described in conjunction with the aspect or embodiment can be included in at least one aspect or embodiment. The appearances of the phrase "in one embodiment" or "in one aspect" in various places in the specification do not necessarily all refer to the same embodiment or aspect. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

A playlist for a live event that is several hours long can grow to be large, and this large size adds significant overhead to the communications needed to transmit and receive these playlists. This problem becomes even greater in the case of low latency HLS because the live (updated) playlist is transferred more often than conventional HLS. A description of low latency HLS is provided in U.S. Provisional Patent Application Nos. 62/807,329, filed Feb. 19, 2019 and entitled LOW LATENCY STREAMING DATA, and U.S. Provisional Patent Application No. 62/810,075 filed Feb. 25, 2019 and entitled LOW LATENCY STREAMING MEDIA. Prior attempts at addressing this problem include two approaches. First, the playlist can be compressed to reduce its size and thereby reduce the overhead associated with transmission of the playlist. Second, the playlist can be reduced in size by using a rolling or sliding window playlist in which a playlist is created by rolling off the top of the playlist the oldest content so that the playlist presents a current view of the content without the oldest content.

This disclosure presents aspects of another approach to reduce the size of a playlist.

Figure 1:
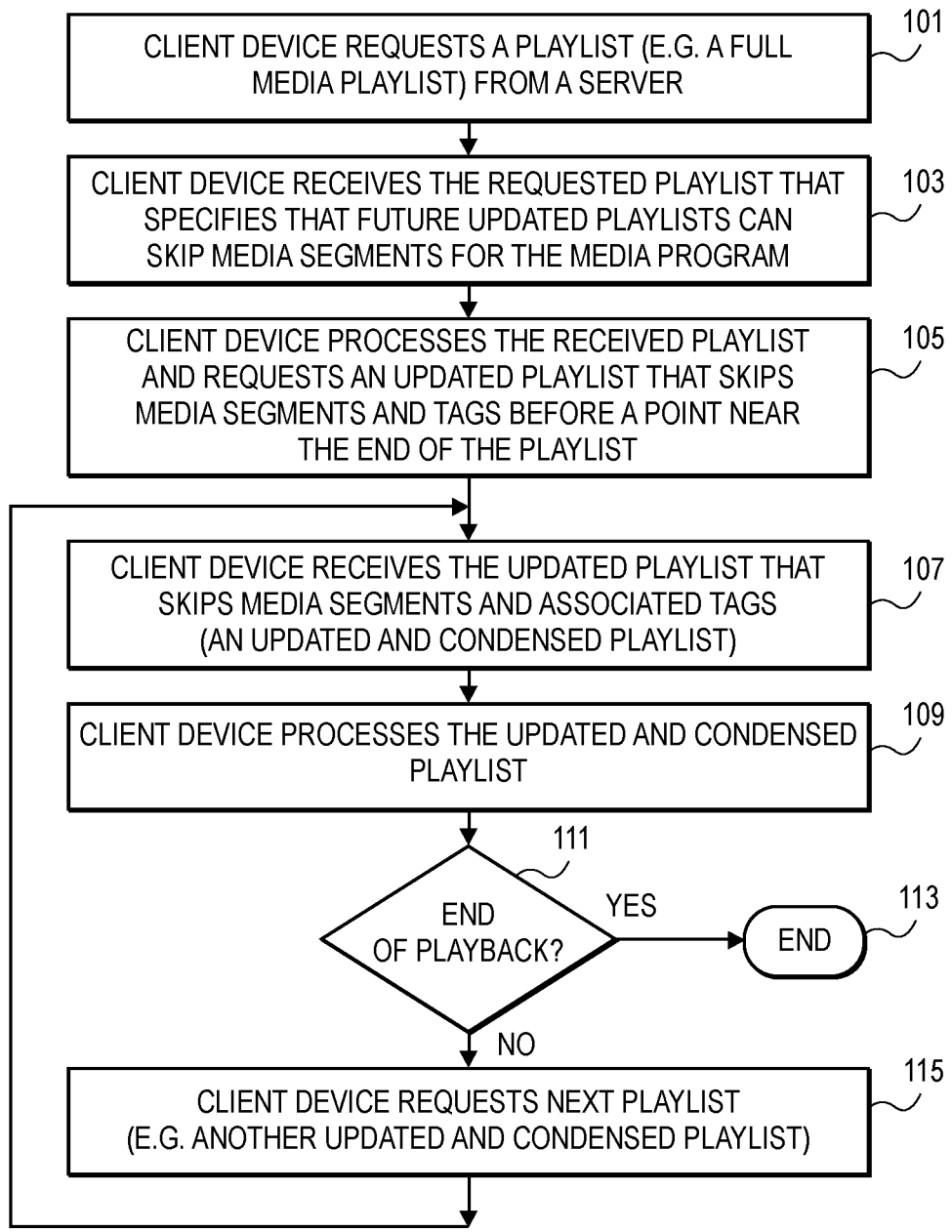
FIG. 1 is a flowchart showing one generalized method according to an aspect described herein.

According to one aspect of this disclosure, server devices that provide playlists can opt-in to one or more methods that use condensed playlists during reloads of the playlist to provide updated playlists to client devices. FIG. 1 shows an example of one such method.

Referring to FIG. 1, a client device can in operation 101 request a playlist from a set of one or more servers which includes at least one server device. The request can be in the form of a URL that specifies a media playlist for a program of media content such as a live sports event (e.g., a baseball game), and the requested media playlist can be a current full playlist that is currently available at the server device and is near the live edge of the live sports event. The server device can respond to the request by transmitting the media playlist to the client device. If the server device supports skipping media segments, the server device can include a skip indicator in the media playlist.

The skip indicator can include a skip boundary which is described further below. In operation 103, the client device receives the requested playlist that specifies that future updated playlists can skip media segments for the media program. In operation 105, the client device can process the received playlist and can then request an updated playlist that skips media segments and tags before a point near the end of the playlist which can be the skip boundary. The processing of the received playlist in operation 105 can include a plurality of operations which are described further below such as requesting a sequence of media segments in order to present the media program to a user. For example, using conventional methods in processing a playlist, the client device can request a series of media segments over time in order to re-create the media program such as a live baseball game. The client device can perform other operations when it processes the received playlist such as the creation of a stored copy of the full playlist on the client device which can be used to reconcile updated playlists as they are received. The request for an updated playlist in operation 105 can include a skip query parameter that is specified in a playlist update GET request using an HTTP compliant request. Then in operation 107, the client device can receive the updated playlist that skips media segments and associated tags. This updated playlist can be referred to as an updated and condensed playlist. Once received, the updated and condensed playlist can be processed in operation 109 by the client device. This can include retrieving media segments and presenting the media segments in order to re-create the program content. As long as playback continues, the client device can repeat the process by proceeding from operation 111 to operation 115 and looping back to operation 107 as shown in FIG. 1. If playback ends, the method can end in operation 113. In operation 115, the client device can request the next playlist which can be another updated and condensed playlist. Alternatively, the client may request a full playlist depending upon the circumstances involved in the playback of the media content as will be explained further below.

Figure 2:
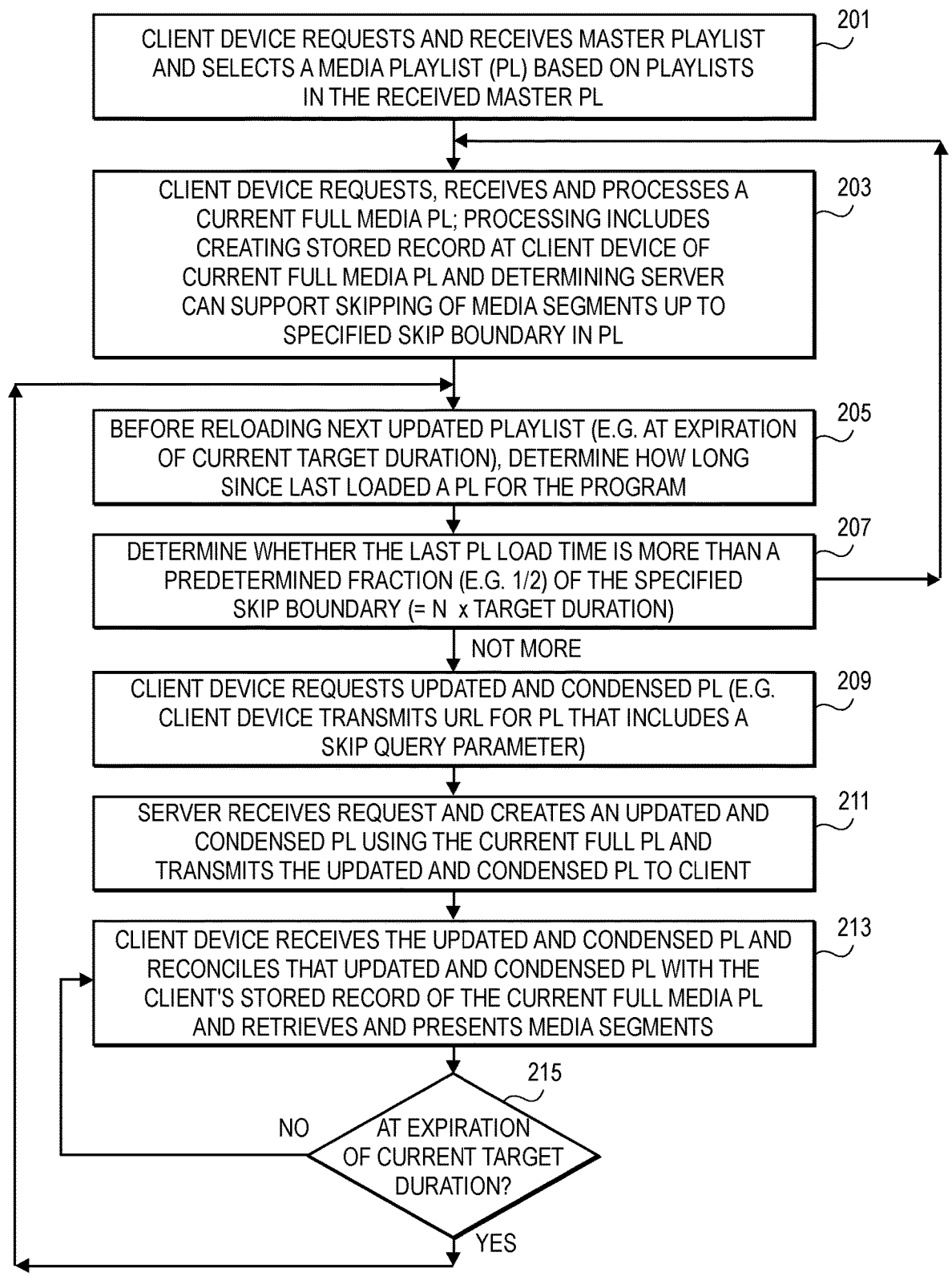
FIG. 2 is a flowchart showing another method according to an aspect described herein.

FIG. 1 represents a generalized example of a method according to one aspect. FIG. 2 shows a more specific example which can be utilized according to other aspects described herein. The method shown in FIG. 2 can begin in operation 201. In operation 201, a client device can request and receive a master playlist and can select a media playlist from that master playlist in order to present the media program on the client device. In operation 203, the client device can request a particular media playlist specified in the master playlist. The request can be transmitted to a server device which in turn transmits the media playlist to the client device. The client device receives and processes the media playlist which can be a current full media playlist. According to one aspect, the current full media playlist may utilize a rolling or sliding window approach which is known in the art; alternatively, the full media playlist can be the entire content of the media program from the beginning of the media program up until the current time. According to one aspect, the processing in operation 203 can include creating a stored record at the client device of the current full media playlist. This stored record is intended to match the current full media playlist maintained at the server device and allows the client device to have a complete record of the current full media playlist. The processing in operation 203 can also include determining that the server can support skipping of media segments up to a specified skip boundary in the media playlist. In one implementation, the indication that the server can support skipping is provided by a skip indicator that can include a value of a skip boundary which specifies an amount of time near a live edge of the program that cannot be skipped. The skip indicator in the media playlist can be used by the client to device to determine whether or not to request updated and condensed playlists. This is shown in operations 205 and 207 in FIG. 2. In operation 205, before reloading the next updated playlist the client device determines how long it has been since the last playlist was loaded for the program (last load time) and this last load time will be compared to the skip boundary in operation 207. Operation 205 can be performed at least once during the current target duration which is, in one aspect, a value specified in the playlist which indicates the maximum time duration of each media segment. In one implementation, the skip boundary can be based upon an integer multiple of the target duration, where the integer can be for example 6 or four. For example, if the target duration is six seconds and the integer is six, then the skip boundary can be 36 seconds which means that the last and most recent 36 seconds of the program cannot be skipped. One reason that operation 205 is performed is because the device can go to sleep or the user can pause or stop the playback (or other reasons may cause the device to stop reloading updated playlists). This can cause the device to be out of sync from the last loaded playlist. For example if the user pauses the playback or stops the playback and then resumes playback, a potentially significant period of time which is greater than the skip boundary can lapse between the last load time and the current time. In operation 207, the client device determines whether the last load time is more than a predetermined fraction of the skip boundary which is specified in the media playlist. The predetermined fraction can be, for example, one half of the specified skip boundary; if the skip boundary is 36 seconds and the fraction is 0.5, then operation 207 compares the last load time to 18 seconds. If the last load time is not more than 18 seconds in this example, processing will continue to operation 209. On the other hand, if the last load time is more than 18 seconds, processing reverts back to operation 203 as shown in FIG. 2. In operation 209, the client device requests an updated and condensed playlist; this can be performed by the client device transmitting a URL, that includes a skip query parameter, for the playlist. In operation 211, the server can receive this request and create an updated and condensed playlist using the current full playlist. In one implementation, the server device can create the condensed and updated playlist by removing media segments and their associated tags beginning with the first media segment in the current full playlist up until the last media segment just before the skip boundary and by inserting a skip tag which indicates the number of media segments that have been skipped in the playlist. The media segments and their associated tags within the skip boundary are retained in the updated and condensed playlist. In one implementation, each media segment which is removed includes an associated tag which is also removed, and FIGS. 3A and 3B show examples of these associated tags. The server device can, after creating the updated and condensed playlist, transmit the updated and condensed playlist to the client device at the end of operation 211. Then in operation 213, the client device receives the updated and condensed playlist and reconciles that updated and condensed playlist with its stored record of the current full media playlist. This reconciliation attempts to create a matching copy of the current full media playlist that exists at the server device which sent the updated and condensed playlist to the client device. The process of reconciliation can involve checking media segments in the updated and condensed playlist against corresponding identical media segments in the stored record at the client device to verify that the two match. This in effect verifies that there is some overlap between the media segments in the skip boundary and the stored record of the current full media playlist at the client device. It is desirable to have this overlap between the previously stored current full media playlist that is the stored record at the client device and the updated and condensed playlist that has just been received by the client device. The client device can then, in operation 213, retrieve the media segments in the updated and condensed playlist and present those media segments and continue to do so until the expiration of the current target duration in operation 215. In one implementation which uses low latency HLS, the client device may request an updated and condensed playlist much sooner than the expiration of the current target duration. At some point either near the current target duration or well before the current target duration in the case of low latency HLS, the client device proceeds from decision operation 215 back to operation 205 to repeat the process to reload the next updated playlist.

FIG. 3A shows an example of a playlist 301 which can be the current full media playlist at a certain point in time during the presentation of program content derived from media segments specified within the playlist 301. The playlist 301 can be an example of an HLS playlist and can include a tag that indicates that the server device can support low latency HLS, such as the tag 305. In addition, a tag specified in the playlist 301 can be a skip indicator, such as the skip indicator 307 shown in FIG. 3A. The playlist 301 includes a plurality of media segments specified in the playlist, such as media segment 303. The vertical ellipsis 302 represents media segments that are present in the playlist 301 but are not shown in FIG. 3A for the sake of brevity. In addition, the skip boundary 309 is shown at the end of the playlist and it is the set of segments which cannot be skipped when the client device utilizes one or more of the methods described herein. The skip boundary 309 is specified as 36 seconds by the skip indicator 307 in the example shown in FIG. 3A.

FIG. 3B shows a playlist 321 which is an updated and condensed playlist that is derived from the current full playlist 301 shown in FIG. 3A. In this example, over 400 media segment identifiers and their associated tags have been removed from the playlist 321 so that the playlist 321 is shorter than the playlist 301 and will consume less communications overhead in the process of transmitting the playlist to the client device. The skip boundary 309 remains at the end of the playlist 321, and a skip tag 323 has been inserted into the playlist 321. The skip tag can indicate the number of media segments that have been skipped in the updated and condensed playlist as shown in FIG. 3B.

In one embodiment, a server system can also indicate that it can support skipping over older daterange tags, such as EXT-X-DATERANGE tags used in HLS, so that these skipped over tags are not included in an updated and condensed playlist that is requested by a client device. As is known in the art, the daterange tags used in HLS can be used to provide splice information, such as splice information according to the SCTE-35 specification. A server can indicate that it supports skipping over such tags by an indicator that it places in a playlist; for example, in one embodiment, the server can include, in a playlist, an indicator such as CAN-SKIP-DATERANGE=YES which indicates that the serve can produce an updated and condensed playlist that skips over such daterange tags (e.g., EXT-X-DATERANGE tags used in HLS) in addition to skipping over media segments. In one embodiment, if the EXT-X-SERVER-CONTROL tag contains a CAN-SKIP-DATERANGES=YES attribute, the client can request a condensed and updated playlist (also referred to as a Playlist Delta Update) that skips both older media Segments and older EXT-X-DATERANGE tags by adding an "_HLS_skip=2" query parameter to the Media Playlist URL when it requests the Playlist. In one embodiment, a condensed and updated playlist can skip any DATERANGE tags added to the playlist or removed from the playlist more than CAN-SKIP-UNTIL seconds ago.

DATERANGE tags added within the last CAN-SKIP-UNTIL seconds should appear in the condensed and updated playlist, and DATERANGE tags removed from the playlist within the last CAN-SKIP-UNTIL seconds should be identified in a list carried by a new EXT-X-SKIP tag attribute called RECENTLY-REMOVED-DATERANGES. The list carried by this attribute called RECENTLY-REMOVED-DATERANGES can be a list of EXT-X-DATERANGE IDs that have been removed from the Playlist recently such as a list of the date ranges that were removed from the Playlist within CAN-SKIP-UNTIL seconds of the Playlist request.

Figure 4:
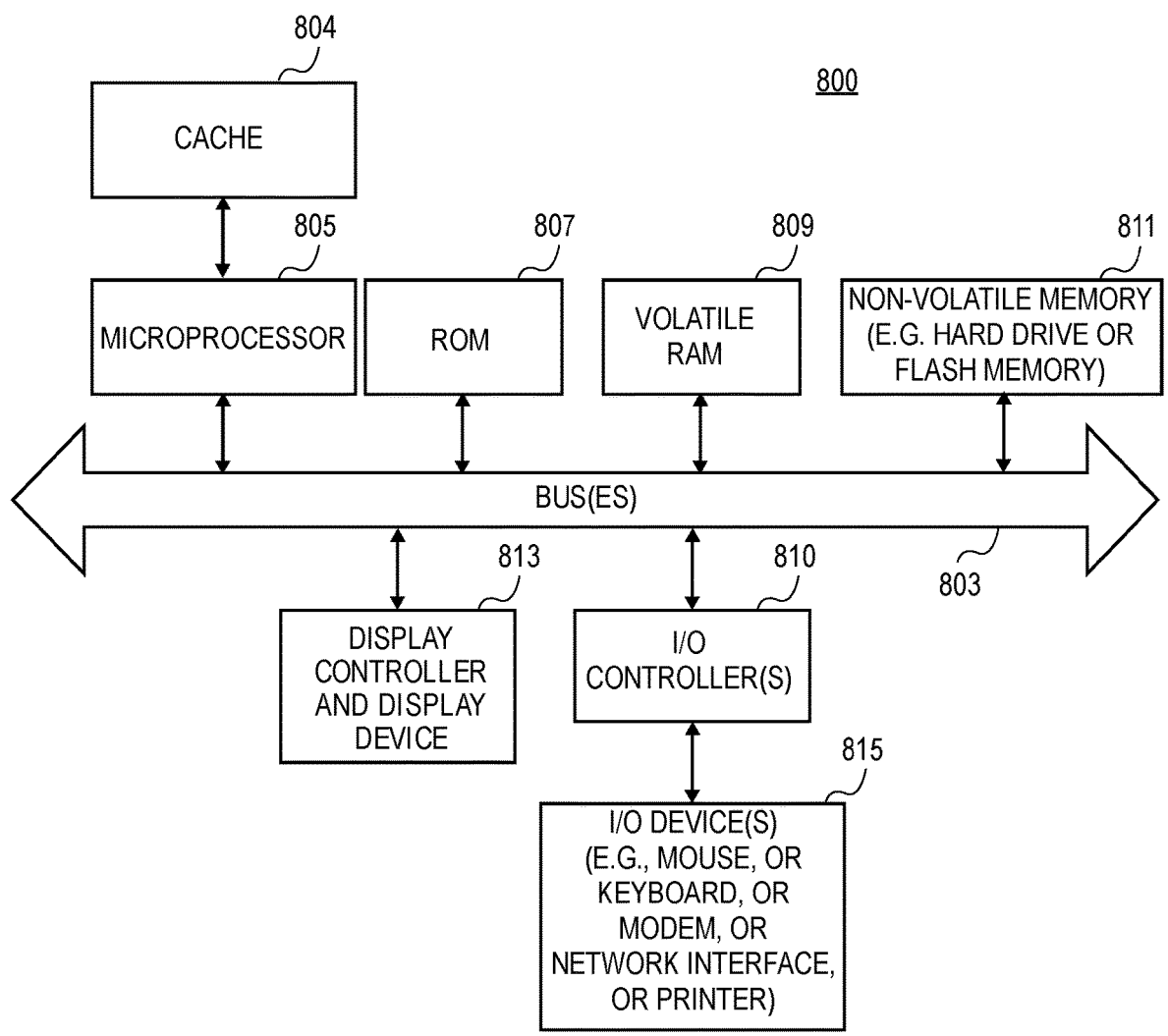
FIG. 4 shows an example of a data processing system that can be used as a client device or a server device to perform the one or more methods described herein.

FIG. 4 shows one example of a data processing system 800, which may be used with one embodiment. For example, the system 800 shows an example of client devices or server systems used in HLS systems and the system 800 can be used to perform one or more of the methods described herein. Note that while FIG. 4 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 4, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 8 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method comprising:
    requesting, by a client device, a first playlist that comprises a plurality of uniform resource identifiers (URIs), the plurality of URIs identifying a plurality of media segments that can be requested and received, in a transfer protocol compliant manner, to recreate a stream of a program of media content, the first playlist including URIs for a set of the media segments of the program up to a first point in time;

receiving, at the client device from a server device, the first playlist, the first playlist including a skip indicator that indicates that the server device supports providing updated and condensed playlists that skip URIs for media segments.

2. The non-transitory machine readable medium as in claim 1, wherein the method further comprises:

requesting, by the client device, a first updated and condensed playlist that skips URIs for media segments;

receiving, by the client device, the first updated and condensed playlist which includes a skip tag that indicates which media segments that have been skipped in the updated and condensed playlist.

3. The non-transitory machine readable medium as in claim 2, wherein the skip indicator includes a value of a skip boundary that specifies an amount of time near a live edge of the program that cannot be skipped or specifies how far from the live edge of a playlist a segment must be in order to be skippable.

4. The non-transitory machine readable medium as in claim 3, wherein the method further comprises:

determining a period of time since a last playlist for the program was loaded;

comparing the period of time to the value of the skip boundary;

requesting a second playlist that is a current full playlist for the program if the comparing produces a first result;

requesting a second updated and condensed playlist for the program if the comparing produces a second result which is different than the first result, and the first result can include a case in which the period of time exceeds the value of the skip boundary.

5. The non-transitory machine readable medium as in claim 4 wherein the comparing is performed at least once during every target duration which is a maximum media segment duration that is specified in the first playlist.

6. The non-transitory machine readable medium as in claim 2 wherein a media sequence tag is not skipped and the media sequence tag comprises a media sequence number of the first URI for a media segment that appears in the first updated and condensed playlist.

7. The non-transitory machine readable medium as in claim 1, wherein the method further comprises:

reconciling the first updated and condensed playlist against a stored copy at the client device of a current full playlist for the program.

8. The non-transitory machine readable medium as in claim 7 wherein the reconciling determines there is at least one media segment following the media segments that were skipped that is the same in both of the stored copy and the first updated and condensed playlist, and wherein the stored copy is created before receiving the first updated and condensed playlist.

9. The non-transitory machine readable medium as in claim 1 wherein tags associated with skipped media segments are also skipped and wherein the set of media segments for the program is in a rolling playlist in which older media segments have been rolled off the first playlist by the server device.

10. The non-transitory machine readable medium as in claim 1 wherein the first playlist does not include a tag that indicates that no further media segments will be added to any playlist that includes the tag, and wherein the tag prevents the client device from requesting updated and condensed playlists.

11. The non-transitory machine readable medium as in claim 1 wherein the support for providing skipping is optional for the server device and this optionality is communicated to the client device to inform the client device whether it can request updated and condensed playlists.

12. A machine implemented method, the method comprising:

requesting, by a client device, a first playlist that comprises a plurality of uniform resource identifiers (URIs), the plurality of URIs identifying a plurality of media segments that can be requested and received, in a transfer protocol compliant manner, to recreate a stream of a program of media content, the first playlist including URIs for a set of the media segments of the program up to a first point in time;

receiving, at the client device from a server device, the first playlist, the first playlist including a skip indicator that indicates that the server device supports providing updated and condensed playlists that skip URIs for media segments.

13. The method as in claim 12, wherein the method further comprises:

requesting, by the client device, a first updated and condensed playlist that skips URIs for media segments;

receiving, by the client device, the first updated and condensed playlist which includes a skip tag that indicates which media segments that have been skipped in the updated and condensed playlist.

14. The method as in claim 13, wherein the skip indicator includes a value of a skip boundary that specifies an amount of time near a live edge of the program that cannot be skipped or specifies how far from the live edge of a playlist a segment must be in order to be skippable.

15. A non-transitory machine readable medium storing executable program instructions which when executed by a data processing system cause the data processing system to perform a method comprising:

receiving, at a set of one or more server systems, a request, from a client device, for a media playlist;

transmitting the requested media playlist, the requested media playlist including a skip indicator that indicates the set of one or more server systems can support the transmission of updated and condensed playlists that skip URIs for media segments;

receiving a request from the client device for a first updated and condensed playlist;

transmitting the first updated and condensed playlist in response to the request.

16. The non-transitory machine readable medium as in claim 15 wherein the first updated and condensed playlist includes a skip tag that indicates which media segments have been skipped in the first updated and condensed playlist.

17. The non-transitory machine readable medium as in claim 16 wherein the skip indicator includes a value of a skip boundary that specifies an amount of time near a live edge of a program that can be skipped or how far from the live edge of the playlist a media segment must be in order for it to be skippable.

18. A machine implemented method, the method comprising:

receiving, at a set of one or more server systems, a request, from a client device, for a media playlist;

transmitting the requested media playlist, the requested media playlist including a skip indicator that indicates the set of one or more server systems can support the transmission of updated and condensed playlists that skip URIs for media segments;
receiving a request from the client device for a first updated and condensed playlist;
transmitting the first updated and condensed playlist in response to the request.

19. The method as in claim 18, wherein the first updated and condensed playlist includes a skip tag that indicates which media segments have been skipped in the first updated and condensed playlist.

20. The method as in claim 19, wherein the skip indicator includes a value of a skip boundary that specifies an amount of time near a live edge of a program that can be skipped or how far from the live edge of the playlist a media segment must be in order for it to be skippable.

* * * * *